US012401995B2

(12) United States Patent
Ho et al.

(10) Patent No.: US 12,401,995 B2
(45) Date of Patent: *Aug. 26, 2025

(54) MULTI-LINK WIRELESS COMMUNICATION SECURITY

(71) Applicant: QUALCOMM Incorporated, San Diego, CA (US)

(72) Inventors: Sai Yiu Duncan Ho, San Diego, CA (US); Jouni Kalevi Malinen, Tuusula (FI); George Cherian, San Diego, CA (US); Alfred Asterjadhi, San Diego, CA (US); Abhishek Pramod Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/478,704

(22) Filed: Sep. 29, 2023

(65) Prior Publication Data

US 2024/0031801 A1    Jan. 25, 2024

Related U.S. Application Data

(63) Continuation of application No. 17/189,895, filed on Mar. 2, 2021, now Pat. No. 11,812,257.

(Continued)

(51) Int. Cl.
*H04W 12/03*    (2021.01)
*H04W 12/041*   (2021.01)
(Continued)

(52) U.S. Cl.
CPC ......... *H04W 12/03* (2021.01); *H04W 12/041* (2021.01); *H04W 12/06* (2013.01);
(Continued)

(58) Field of Classification Search
CPC ... H04W 12/03; H04W 76/15; H04W 12/106; H04W 12/041; H04W 12/06; H04W 88/08
See application file for complete search history.

(56) References Cited

U.S. PATENT DOCUMENTS

| 9,491,621 B2 | 11/2016 | Cherian et al. |
| 10,158,602 B2 | 12/2018 | Lee et al. |

(Continued)

FOREIGN PATENT DOCUMENTS

| EP | 2432265 A1 | 3/2012 |
| EP | 3319295 A1 | 5/2018 |
| WO | WO-2015038642 | 3/2015 |

OTHER PUBLICATIONS

Ho (Qualcomm) D., et al., "MLA MAC Addresses Considerations", IEEE Draft; 11-19-1899-07-00BE-MLA-MAC-ADDRESSES-CONSIDERATIONS, IEEE 802.11-19/1899r7, IEEE-SA Mentor, Piscataway, NJ, USA, vol. 802.11 EHT; 802.11be, No. 7, Jan. 16, 2020 (Jan. 16, 2020), pp. 1-16, XP068172594, Jan. 9, 2020, the whole document.

(Continued)

*Primary Examiner* — William R Korzuch
*Assistant Examiner* — Forrest L Carey
(74) *Attorney, Agent, or Firm* — Holland & Hart LLP

(57) ABSTRACT

This disclosure provides systems, methods, and apparatuses for wireless communication performed by a wireless communication device. An example wireless communication device includes an access point (AP) multi-link device (MLD). The AP MLD transmits a beacon frame to a wireless station (STA) MLD, the beacon frame including a plurality of AP medium access control (MAC) addresses of respective APs belonging to the AP MLD. The AP MLD receives an association request from the STA MLD, the association request including a plurality of STA MAC addresses of (Continued)

respective STAs belonging to the STA MLD. The AP MLD generates, during a handshake operation with the STA MLD, one or more encryption keys configured to encrypt communications between the AP MLD and the STA MLD. The AP MLD verifies the plurality of STA MAC addresses based at least in part on the one or more encryption keys.

20 Claims, 9 Drawing Sheets

Related U.S. Application Data

(60) Provisional application No. 62/985,311, filed on Mar. 4, 2020.

(51) Int. Cl.
*H04W 12/06* (2021.01)
*H04W 12/106* (2021.01)
*H04W 76/15* (2018.01)
*H04W 88/08* (2009.01)

(52) U.S. Cl.
CPC ......... *H04W 12/106* (2021.01); *H04W 76/15* (2018.02); *H04W 88/08* (2013.01)

(56) References Cited

U.S. PATENT DOCUMENTS

| | | | |
|---|---|---|---|
| 10,548,008 B2 | 1/2020 | Shulman et al. | |
| 11,722,894 B2 | 8/2023 | Bajko et al. | |
| 11,870,885 B2 | 1/2024 | Chitrakar et al. | |
| 11,917,407 B2 | 2/2024 | Harding et al. | |
| 2010/0332822 A1* | 12/2010 | Liu | H04W 12/041 713/151 |
| 2011/0055558 A1* | 3/2011 | Liu | H04L 9/0637 713/160 |
| 2011/0154038 A1* | 6/2011 | Qi | H04W 12/50 380/34 |
| 2019/0034602 A1* | 1/2019 | Votaw | H04W 12/06 |
| 2019/0037595 A1 | 1/2019 | Cherian et al. | |
| 2020/0008095 A1 | 1/2020 | Patil et al. | |
| 2020/0245137 A1* | 7/2020 | Chitrakar | H04W 52/0219 |
| 2021/0282007 A1 | 9/2021 | Ho | |
| 2023/0224710 A1 | 7/2023 | Huang et al. | |

OTHER PUBLICATIONS

International Search Report and Written Opinion—PCT/US2021/020617—ISA/EPO—Jun. 16, 2021.

* cited by examiner

MULTI-LINK WIRELESS COMMUNICATION SECURITY

CROSS-REFERENCE TO RELATED APPLICATION

The present application for patent is a Continuation of U.S. patent application Ser. No. 17/189,895 entitled "MULTI-LINK WIRELESS COMMUNICATION SECURITY" filed Mar. 2, 2021, which claims priority to U.S. Provisional Patent Application No. 62/985,311 entitled "MULTI-LINK WIRELESS COMMUNICATION SECURITY" filed on Mar. 4, 2020, which are assigned to the assignee hereof. The disclosures of all prior applications are considered part of and are incorporated by reference in this patent application in their respective entireties.

TECHNICAL FIELD

This disclosure relates generally to wireless networks, and more specifically, to securing multi-link wireless communications.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

SUMMARY

The systems, methods, and devices of this disclosure each have several innovative aspects, no single one of which is solely responsible for the desirable attributes disclosed herein.

One innovative aspect of the subject matter described in this disclosure can be implemented as a method for wireless communication. The method may be performed by an access point (AP) multi-link device (MLD), and may include transmitting a beacon frame to a wireless station (STA) MLD, the beacon frame including a plurality of AP medium access control (MAC) addresses of respective APs belonging to the AP MLD, receiving an association request from the STA MLD, the association request including a plurality of STA MAC addresses of respective STAs belonging to the STA MLD, generating, during a handshake operation with the STA MLD, one or more encryption keys configured to encrypt communications between the AP MLD and the STA MLD, and verifying the plurality of STA MAC addresses based at least in part on the one or more encryption keys. In some implementations, the method may further include generating a pairwise transient key (PTK) based at least in part on the one or more encryption keys, and exchanging one or more encrypted packets with the STA MLD, each of the one or more encrypted packets including a temporal key (TK) generated based on the PTK. In some instances, the method may further include transmitting a first Extensible Authentication Protocol (EAP) over local area network (LAN) (EAPoL) message to the STA MLD, and receiving a second EAPoL message from the STA MLD responsive to the first EAPoL message. In some implementations, the first EAPoL message includes an AP nonce (ANonce), and the second EAPoL message includes a STA nonce (SNonce) and a message integrity code (MIC). In some instances, the generation of the PTK is based at least in part on a pseudo-random function (PRF), a pairwise master key (PMK), the ANonce, or the SNonce. In some other instances, the second EAPoL message further includes a set of first key data encapsulations (KDEs) representative of an address of the STA MLD and a plurality of first MAC addresses, where verifying the plurality of STA MAC addresses includes confirming that each of the first MAC addresses matches a respective one of the STA MAC addresses.

In some implementations, the method further includes transmitting a third EAPoL message to the STA MLD, the third EAPoL message including a group temporal key (GTK) and a set of second KDEs representative of an address of the AP MLD and a plurality of second MAC addresses. In some instances, the method further includes receiving a fourth EAPoL message from the STA MLD, and exchanging one or more encrypted packets with the STA MLD responsive to the fourth EAPoL message, each of the one or more encrypted packets including a temporal key (TK) generated based on the PTK.

Another innovative aspect of the subject matter described in this disclosure can be implemented as a wireless communication device. The wireless communication device may include at least one modem, at least one processor communicatively coupled with the at least one modem, and at least one memory communicatively coupled with the at least one processor and storing processor-readable code that, when executed by the at least one processor in conjunction with the at least one modem, is configured to transmit a beacon frame to a wireless station (STA) MLD, the beacon frame including a plurality of AP medium access control (MAC) addresses of respective APs belonging to the AP MLD, receive an association request from the STA MLD, the association request including a plurality of STA MAC addresses of respective STAs belonging to the STA MLD, generate, during a handshake operation with the STA MLD, one or more encryption keys configured to encrypt communications between the AP MLD and the STA MLD, and verify the plurality of STA MAC addresses based at least in part on the one or more encryption keys.

In some implementations, execution of the processor-readable code is further configured to generate a pairwise transient key (PTK) based at least in part on the one or more encryption keys, and exchange one or more encrypted packets with the STA MLD, each of the one or more encrypted packets including a temporal key (TK) generated based on the PTK. In some instances, execution of the processor-readable code is further configured to transmit a first Extensible Authentication Protocol (EAP) over local area network (LAN) (EAPoL) message to the STA MLD, and receive a second EAPoL message from the STA MLD responsive to the first EAPoL message. In some implementations, the first EAPoL message includes an AP nonce (ANonce), and the second EAPoL message includes a STA nonce (SNonce) and a message integrity code (MIC). In some aspects, the generation of the PTK is based at least in part on a pseudo-random function (PRF), a pairwise master key (PMK), the ANonce, or the SNonce.

In some other implementations, the second EAPoL message further includes a set of first key data encapsulations (KDEs) representative of an address of the STA MLD and a plurality of first MAC addresses, where verifying the plurality of STA MAC addresses includes confirming that each of the first MAC addresses matches a respective one of the STA MAC addresses. In some instances, execution of the processor-readable code is further configured to transmit a third EAPoL message to the STA MLD, the third EAPoL message including a group temporal key (GTK) and a set of second KDEs representative of an address of the AP MLD and a plurality of second MAC addresses.

Another innovative aspect of the subject matter described in this disclosure can be implemented as a method for wireless communication. The method may be performed by a wireless station (STA) multi-link device (MLD), and may include receiving a beacon frame from an access point (AP) MLD, the beacon frame including a plurality of AP medium access control (MAC) addresses of respective APs belonging to the AP MLD, transmitting an association request to the AP MLD, the association request including a plurality of STA MAC addresses of respective STAs belonging to the STA MLD, generating, during a handshake operation with the AP MLD, one or more encryption keys configured to encrypt communications between the AP MLD and the STA MLD, and verifying the plurality of AP MAC addresses based at least in part on the one or more encryption keys.

In some implementations, the method may further include generating a pairwise transient key (PTK) based at least in part on the one or more encryption keys, and exchanging one or more encrypted packets with the AP MLD, each of the one or more encrypted packets including a temporal key (TK) generated based on the PTK. In some instances, the method may further include receiving a first Extensible Authentication Protocol (EAP) over local area network (LAN) (EAPoL) message from the AP MLD, and transmitting a second EAPoL message to the AP MLD responsive to the first EAPoL message. In some aspects, the first EAPoL message includes an AP nonce (ANonce), and the second EAPoL message includes a STA nonce (SNonce) and a message integrity code (MIC). In some implementations, the generation of the PTK is based at least in part on a pseudo-random function (PRF), a pairwise master key (PMK), the ANonce, or the SNonce.

In some other implementations, the second EAPoL message further includes a set of first key data encapsulations (KDEs) representative of an address of the STA MLD and a plurality of first MAC addresses. In some instances, the method may further include receiving a third EAPoL message from the AP MLD, the third EAPoL message including a group temporal key (GTK) and a set of second KDEs representative of an address of the AP MLD and a plurality of second MAC addresses, where verifying the plurality of AP MAC addresses includes confirming that each of the second MAC addresses matches a respective one of the AP MAC addresses. In some aspects, the method may further include transmitting a fourth EAPoL message to the AP MLD, and exchanging one or more encrypted packets with the AP MLD, each of the one or more encrypted packets including a temporal key (TK) generated based on the PTK.

Another innovative aspect of the subject matter described in this disclosure can be implemented as a wireless communication device. The wireless communication device may include at least one modem, at least one processor communicatively coupled with the at least one modem, and at least one memory communicatively coupled with the at least one processor and storing processor-readable code that, when executed by the at least one processor in conjunction with the at least one modem, is configured to receive a beacon frame from an access point (AP) MLD, the beacon frame including a plurality of AP medium access control (MAC) addresses of respective APs belonging to the AP MLD, transmit an association request to the AP MLD, the association request including a plurality of STA MAC addresses of respective STAs belonging to the STA MLD, generate, during a handshake operation with the AP MLD, one or more encryption keys configured to encrypt communications between the AP MLD and the STA MLD, and verify the plurality of AP MAC addresses based at least in part on the one or more encryption keys.

In some implementations, execution of the processor-readable code is further configured to generate a pairwise transient key (PTK) based at least in part on the handshake operation, and exchange one or more encrypted packets with the AP MLD, each of the one or more encrypted packets including a temporal key (TK) generated based on the PTK. In some instances, execution of the processor-readable code is further configured to receive a first Extensible Authentication Protocol (EAP) over local area network (LAN) (EAPoL) message from the AP MLD, and transmit a second EAPoL message to the AP MLD responsive to the first EAPoL message. In some implementations, the first EAPoL message includes an AP nonce (ANonce), and the second EAPoL message includes a STA nonce (SNonce) and a message integrity code (MIC).

In some instances, the generation of the PTK is based at least in part on a pseudo-random function (PRF), a pairwise master key (PMK), the ANonce, or the SNonce. In some other instances, the second EAPoL message further includes a set of first key data encapsulations (KDEs) representative of an address of the STA MLD and a plurality of first MAC addresses. In some implementations, execution of the processor-readable code is further configured to receive a third EAPoL message from the AP MLD, the third EAPoL message including a group temporal key (GTK) and a set of second KDEs representative of an address of the AP MLD and a plurality of second MAC addresses, where verifying the plurality of AP MAC addresses includes confirming that each of the second MAC addresses matches a respective one of the AP MAC addresses.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Figure 1:
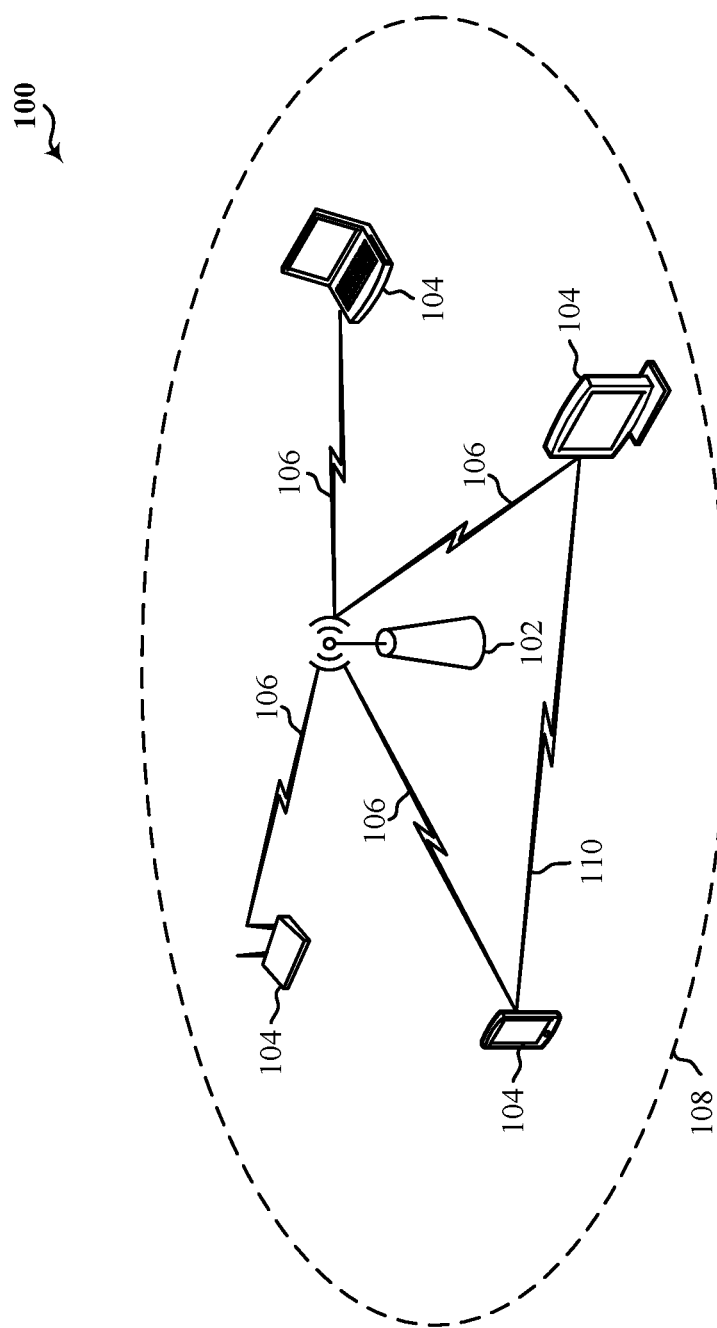
FIG. 1 shows a pictorial diagram of an example wireless communication network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system, or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, or 5G (New Radio (NR)) standards promulgated by the 3rd Generation Partnership Project (3GPP), among others. The described implementations can be implemented in any device, system, or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (JOT) network.

Before a STA may exchange data frames with an AP, the STA must authenticate and associate with the AP by exchanging a series of management frames with the AP during a process known as association. Information transmitted between the AP and an unassociated STA may be unencrypted and thus vulnerable to attack by one or more third parties. That is, a bad actor may access and/or manipulate the transmitted information during the association process, causing subsequent communications between the AP and the STA to be inaccurate, which may delay the communications or even cause the communications to fail. For example, the bad actor may spoof the medium access control (MAC) address of the AP or STA during the association process.

Once the STA is authenticated and associated with the AP, the devices may perform a security protocol to generate encryption keys that the AP and the STA may use to protect the data carried in the subsequently exchanged data frames. For example, the AP and the STA may generate encryption keys by exchanging four Extensible Authentication Protocol (EAP) over LAN (EAPoL) messages during a security protocol known as the "four-way handshake." At least some of the encryption keys are generated using the MAC addresses of the AP and the STA. Thus, the four-way handshake has traditionally been used as a means of verifying the addresses of the AP and the STA.

Recent improvements to the IEEE 802.11 family of standards include support for multi-link (ML) communications. Devices (including APs and STAs) with ML capabilities may be referred to as multi-link devices (MLDs). Accordingly, an AP MLD may communicate with a STA MLD over multiple communication links, concurrently. Each of the communication links may be used for communications between a respective AP of the AP MLD and a respective STA of the STA MLD. The AP MLD may have a MAC address (also referred to as an "MLD address") and each of its APs also may have respective MAC addresses. The STA MLD may have a MAC address and each of its STAs also may have respective MAC addresses. Thus, additional consideration may be needed in order to use the four-way handshake to protect the unencrypted information exchanged prior to association.

Various implementations relate generally to data transmissions in a multi-link (ML) environment. Some implementations more specifically relate to securing data transmissions between an AP multi-link device (MLD) and a STA MLD. In some implementations, one or more APs may belong to the AP MLD, and one or more STAs may belong to the STA MLD.

Each of the plurality of APs and STAs may have a medium access control (MAC) address. In accordance with implementations described herein, the AP MLD and the STA MLD may exchange the MAC addresses of each of the APs and STAs, respectively, during at least one of a beacon discovery process or an association process. In some implementations, the AP MLD and the STA MLD may be configured to verify the authenticity of the MAC addresses during a handshake operation. The AP MLD and the STA MLD may generate one or more encryption keys during the handshake operation. The AP MLD and the STA MLD may use the one or more encryption keys to encrypt subsequent data communications over the communication links. If, during the handshake operation, the AP MLD or the STA MLD fails to verify one or more of the MAC addresses of the APs or STAs, the AP MLD and the STA MLD may be prevented from operating in an associated state.

Particular implementations of the subject matter described in this disclosure can be implemented to realize one or more of the following potential advantages. By exchanging the MAC addresses of the individual APs of the AP MLD and the individual STAs of the STA MLD during at least one of the beacon discovery process or the association process, aspects of the present disclosure may enable the AP MLD and the STA MLD to verify the authenticity of the MAC addresses exchanged during the association process.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100).

For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba, and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistants (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or reassociate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz, or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication link 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba, and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHz, or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control, and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2:
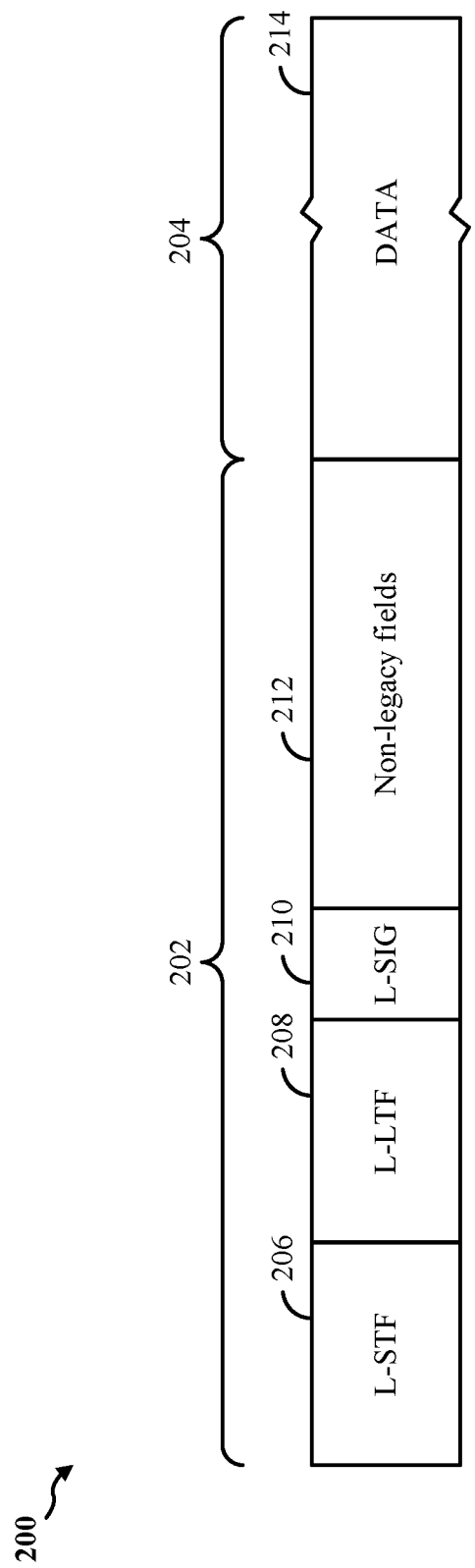
FIG. 2 shows an example protocol data unit (PDU) usable for communications between an access point (AP) and a number of stations (STAs).

FIG. 2 shows an example protocol data unit (PDU) 200 usable for wireless communication between an AP and a number of STAs. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two binary phase shift keying (BPSK) symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 also may include a non-legacy portion including one or more non-legacy fields 212, for example, conforming to an IEEE wireless communication protocol, such as the IEEE 802.11ac, 802.11ax, 802.11be, or later wireless communication protocol standards.

The L-STF 206 generally enables a receiving device to perform automatic gain control (AGC) and coarse timing and frequency estimation. The L-LTF 208 generally enables a receiving device to perform fine timing and frequency estimation and also to estimate of the wireless channel. The L-SIG 210 generally enables a receiving device to determine a duration of the PDU and to use the determined duration to avoid transmitting on top of the PDU. For example, the L-STF 206, the L-LTF 208, and the L-SIG 210 may be modulated according to a BPSK modulation scheme. The payload 204 may be modulated according to a BPSK modulation scheme, a quadrature BPSK (Q-BPSK) modulation scheme, a quadrature amplitude modulation (QAM) scheme, or another appropriate modulation scheme. The payload 204 may generally carry higher layer data, for example, in the form of medium access control (MAC) protocol data units (MPDUs) or aggregated MPDUs (A-MPDUs).

Figure 3:
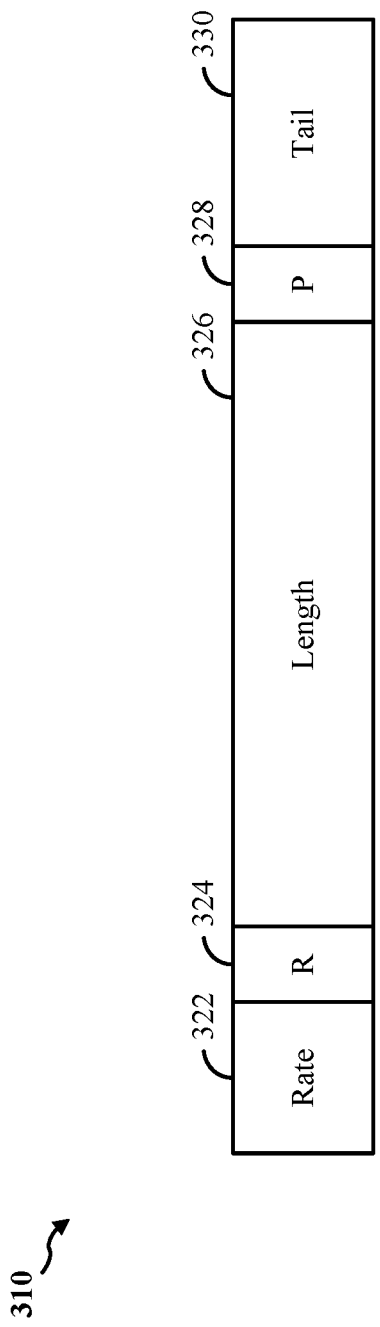
FIG. 3 shows an example field in the PDU of FIG. 2.

FIG. 3 shows an example L-SIG 310 in the PDU 200 of FIG. 2. The L-SIG 310 includes a data rate field 322, a reserved bit 324, a length field 326, a parity bit 328, and a tail field 330. The data rate field 322 indicates a data rate (note that the data rate indicated in the data rate field 322 may not be the actual data rate of the data carried in the payload 304). The length field 326 indicates a length of the packet in units of, for example, symbols or bytes. The parity bit 328 may be used to detect bit errors. The tail field 330 includes tail bits that may be used by the receiving device to terminate operation of a decoder (for example, a Viterbi decoder). The receiving device may utilize the data rate and the length indicated in the data rate field 322 and the length field 326 to determine a duration of the packet in units of, for example, microseconds (Rs) or other time units.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it must wait for a particular time and then contend for access to the wireless medium. In some implementations, the wireless communication device may be configured to implement the DCF through the use of carrier sense multiple access (CSMA) with collision avoidance (CA) (CSMA/CA) techniques and timing intervals. Before transmitting data, the wireless communication device may perform a clear channel assessment (CCA) and determine that the appropriate wireless channel is idle. The CCA includes both physical (PHY-level) carrier sensing and virtual (MAC-level) carrier sensing. Physical carrier sensing (or packet detection (PD)) is accomplished via a measurement of the received signal strength of a valid frame, which is then compared to a value to determine whether the channel is busy. For example, if the received signal strength of a detected preamble is above the value, the medium is considered busy. Physical carrier sensing also includes energy detection (ED). Energy detection involves measuring the total energy the wireless communication device receives regardless of whether the received signal represents a valid frame. If the total energy detected is above a value, the medium is considered busy. Virtual carrier sensing is accomplished via the use of a network allocation vector (NAV), an indicator of a time when the medium may next become idle. The NAV is reset each time a valid frame is received that is not addressed to the wireless communication device. The NAV effectively serves as a time duration that must elapse before the wireless communication device may contend for access even in the absence of a detected symbol or even if the detected energy is below the value.

As described above, the DCF is implemented through the use of time intervals. These time intervals include the slot time (or "slot interval") and the inter-frame space (IFS). The slot time is the basic unit of timing and may be determined based on one or more of a transmit-receive turnaround time, a channel sensing time, a propagation delay, and a MAC processing time. Measurements for channel sensing are performed for each slot. All transmissions may begin at slot boundaries. Example varieties of IFS include: the short IFS (SIFS), the distributed IFS (DIFS), the extended IFS (EIFS), or the arbitration IFS (AIFS). For example, the DIFS may be defined as the sum of the SIFS and two times the slot time. The values for the slot time and IFS may be provided by a suitable standard specification, such as one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba, and 802.11be).

When the NAV reaches 0, the wireless communication device performs physical carrier sensing. If the channel remains idle for the appropriate IFS (for example, a DIFS), the wireless communication device initiates a backoff timer, which represents a duration of time that the device must sense the medium to be idle before it is permitted to transmit. The backoff timer is decremented by one slot each time the medium is sensed to be idle during a corresponding slot interval. If the channel remains idle until the backoff timer expires, the wireless communication device becomes the holder (or "owner") of a transmit opportunity (TXOP) and may begin transmitting. The TXOP is the duration of time the wireless communication device can transmit frames over the channel after it has won contention for the wireless medium. If, on the other hand, one or more of the carrier sense mechanisms indicate that the channel is busy, a MAC controller within the wireless communication device will not permit transmission.

Each time the wireless communication device generates a new PPDU for transmission in a new TXOP, it randomly selects a new backoff timer duration. The available distribution of numbers that may be randomly selected for the backoff timer is referred to as the contention window (CW). If, when the backoff timer expires, the wireless communication device transmits the PPDU, but the medium is still busy, there may be a collision. Additionally, if there is otherwise too much energy on the wireless channel resulting in a poor signal-to-noise ratio (SNR), the communication may be corrupted or otherwise not successfully received. In such instances, the wireless communication device may not receive a communication acknowledging the transmitted PDU within a timeout interval. The MAC may then increase the CW exponentially, for example, doubling it, and randomly select a new backoff timer duration from the CW before each attempted retransmission of the PPDU. Before each attempted retransmission, the wireless communication device may wait a duration of DIFS and, if the medium remains idle, proceed to initiate the new backoff timer. There are different CW and TXOP durations for each of the four access categories (ACs): voice (AC_VO), video (AC_VI), background (AC_BK), and best effort (AC_BE). This enables particular types of traffic to be prioritized in the network.

As described above, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from the corresponding STAs 104 to the AP 102). To support the MU transmissions, the APs 102 and the STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52-tone, 106-tone, 242-tone, 484-tone, and 996-tone RUs also may be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or an UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs) and may assign each AID (and thus, each STA 104) one or more RUs that can be used to send UL traffic to the AP 102. The AP also may designate one or more random access (RA) RUs that unscheduled STAs 104 may contend for.

Figure 4:
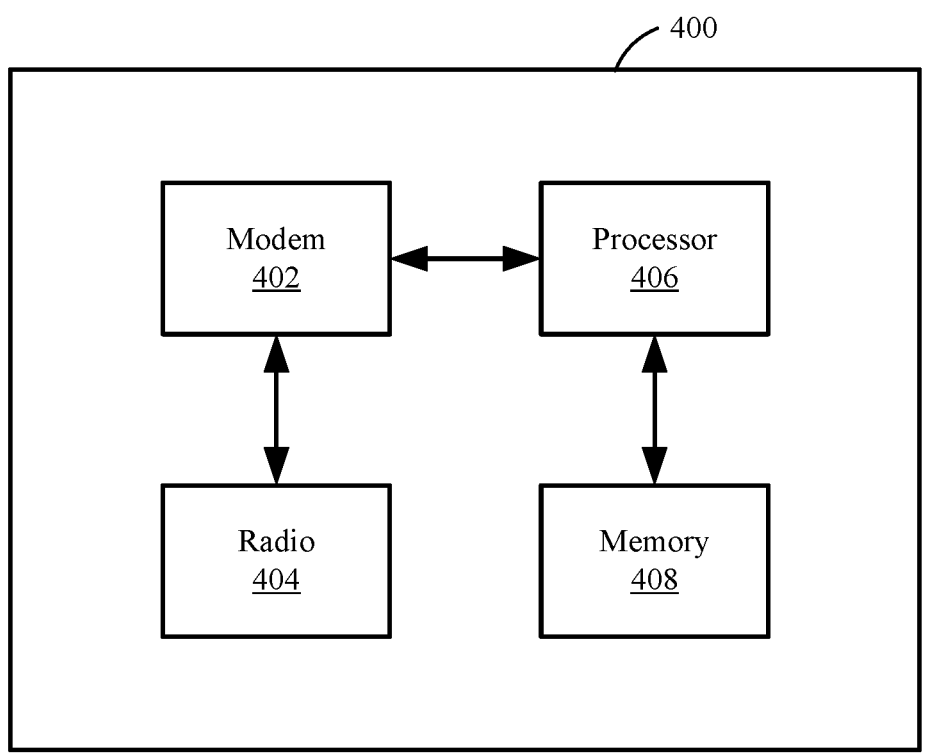
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described above with reference to FIG. 1. In some implementations, the wireless communication device 400 can be an example of a device for use in an AP such as the AP 102 described above with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba, and 802.11be.

The wireless communication device 400 can be, or can include, a chip, system on chip (SoC), chipset, package, or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks, or processing elements 406 (collectively "the processor 406"), and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer, and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number Nss of spatial streams or a number NsTs of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation, or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames, or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 406, cause the processor to perform various operations described herein for wireless communication, including the generation, transmission, reception, and interpretation of MPDUs, frames, or packets. For example, various functions of components disclosed herein, or various blocks or steps of a method, operation, process, or algorithm disclosed herein, can be implemented as one or more modules of one or more computer programs.

Various implementations relate generally to data transmissions in a multi-link (ML) environment. Some implementations more specifically relate to securing data transmissions between an AP multi-link device (MLD) and a STA MLD. In some implementations, one or more APs may belong to the AP MLD, and one or more STAs may belong to the STA MLD.

Each of the plurality of APs and STAs may have a medium access control (MAC) address. In accordance with implementations described herein, the AP MLD and the STA MLD may exchange the MAC addresses of each of the APs and STAs, respectively, during at least one of a beacon discovery process or an association process. In some implementations, the AP MLD and the STA MLD may be configured to verify the authenticity of the MAC addresses during a handshake operation. The AP MLD and the STA MLD may generate one or more encryption keys during the handshake operation. The AP MLD and the STA MLD may use the one or more encryption keys to encrypt subsequent data communications over the communication links. If, during the handshake operation, the AP MLD or the STA MLD fails to verify one or more of the MAC addresses of the APs or STAs, the AP MLD and the STA MLD may be prevented from operating in an associated state.

Particular implementations of the subject matter described in this disclosure can be implemented to realize one or more of the following potential advantages. By exchanging the MAC addresses of the individual APs of the AP MLD and the individual STAs of the STA MLD during at least one of the beacon discovery process or the association process, aspects of the present disclosure may enable the AP MLD and the STA MLD to verify the authenticity of the MAC addresses exchanged during the association process.

Figure 5:
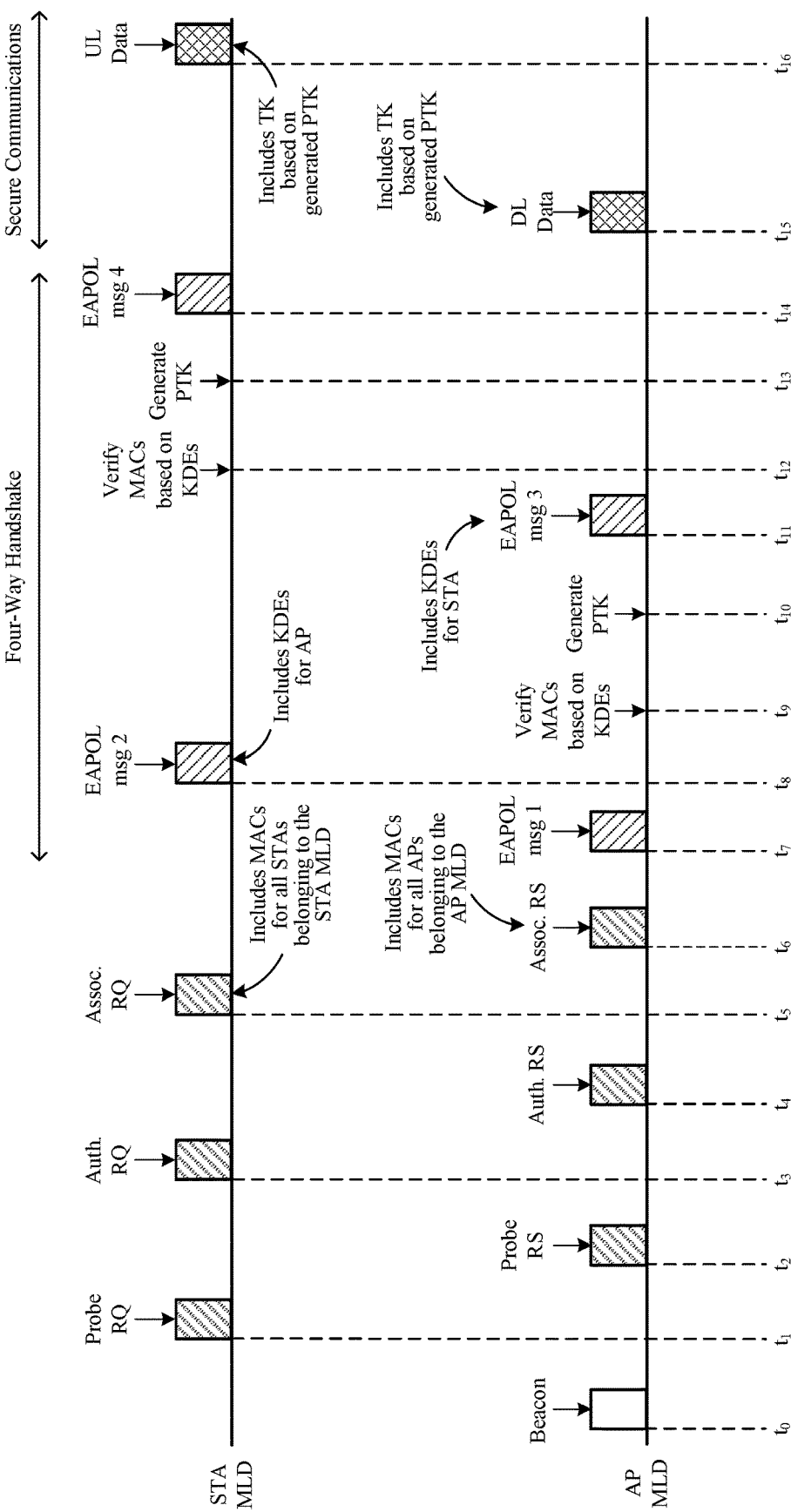
FIG. 5 shows a timing diagram depicting an example operation for wireless communication that supports multi-link communications.

FIG. 5 shows a sequence diagram depicting example operations 500 for wireless communication between a number of wireless devices. In some implementations, the example operations 500 may be performed between an AP and a STA. The AP may be any suitable AP including, for example, the AP 102 of FIG. 1 or the device 400 of FIG. 4. In some implementations, the AP may be a multi-link device (MLD) ("AP MLD"). The AP MLD may include multiple APs each having a unique medium access control (MAC) address. The AP MLD may also have a MAC address, which may be the same or different than any of the MAC addresses of the multiple APs. The STA may be any suitable STA including, for example, one of the STAs 104 of FIG. 1 or the STA 400 of FIG. 4. In some implementations, the STA may be a MLD ("STA MLD"). The STA MLD may include multiple STAs each having a unique MAC address. The STA MLD may also have a MAC address, which may be the same or different than any of the MAC addresses of the multiple STAs.

At time $t_0$, the AP MLD may broadcast a beacon frame ("beacon"). In some implementations, the STA MLD may not receive the beacon. In such implementations, the STA MLD may transmit a probe request to the AP MLD at time $t_1$, and the AP MLD may transmit a probe response to the STA MLD at time $t_2$. In some other implementations, the STA MLD may receive the beacon. In such implementations, the STA MLD may not transmit the probe request and the AP MLD may not transmit the probe response.

At time $t_3$, the STA MLD may transmit an authentication request to the AP MLD. In response to the authentication request, the AP MLD may transmit an authentication response to the STA MLD at time $t_4$.

At time $t_5$, the STA MLD may transmit an association request to the AP MLD. In some implementations, the association request may include the MAC addresses of each of the STAs that belong to the STA MLD ("the STA MAC addresses"). As described above, each of the STAs may operate on a respective one of the communication links between the AP MLD and the STA MLD.

In response to the association request, the AP MLD may transmit an association response to the STA MLD at time $t_6$. In some implementations, the association response may include the MAC addresses of each of the APs that belong to the AP MLD ("the AP MAC addresses"). As described above, each of the APs may operate on a respective one of the communication links between the AP MLD and the STA MLD.

In some other implementations, the AP MAC addresses may be included in a beacon, such as the beacon transmitted at time to. The AP MAC addresses may be included in the beacon in addition to, or rather than in, the association response. In some implementations, at least one of the APs that belong to the AP MLD may transmit one or more beacons including the AP MAC addresses. The STA MLD may discover the one or more beacons and transmit the association request including the MAC addresses of each of the STAs that belong to the STA MLD in the same manner as described above with respect to time $t_5$.

At time $t_7$, the STA MLD may be authenticated and associated with the AP MLD and may proceed to execute a security protocol, such as a four-way handshake operation, with the AP MLD. In the example of FIG. 5, the AP MLD and the STA MLD each generate a pairwise transient key (PTK) based on exchanging four Extensible Authentication Protocol (EAP) over LAN (EAPoL) messages during the four-way handshake operation. For example, the AP MLD initiates the handshake operation by transmitting a first EAPoL message ("msg 1") to the STA MLD at time $t_7$. The first EAPoL message may include an AP nonce (ANonce).

In response to the first EAPoL message, the STA MLD transmits a second EAPoL message ("msg 2") to the AP MLD at time $t_8$. The second EAPoL message may include one or more of a STA nonce (SNonce) or a message integrity code (MIC).

In some implementations, the second EAPoL message may further include a set of first key data encapsulations (KDEs). In some aspects, the STA MLD may encapsulate a plurality of first MAC addresses in the set of first KDEs. The plurality of first MAC addresses may include an MLD address of the STA MLD and the MAC addresses of each of the STAs belonging to the STA MLD. At time $t_9$, the AP MLD may confirm that each of the plurality of first MAC addresses matches a respective one of the STA MAC addresses received in the association request at time $t_5$. In this manner, the AP MLD may verify the authenticity of the STA MAC addresses exchanged during the association process. In some implementations, one or more of the STA MAC addresses may be included in subsequent data communications, such as in a MAC header.

After time $t_9$, the AP MLD may proceed to generate one or more encryption keys that may be used to protect data carried in subsequently exchanged data frames. In the example of FIG. 5, the AP MLD generates a PTK at time $t_{10}$. The AP MLD may generate the PTK as a function of a pseudo-random function (PRF), a pairwise master key (PMK), the ANonce, and the SNonce. The PTK may be used to encrypt the subsequent data communications over multiple communication links.

In response to the second EAPoL message, the AP MLD transmits a third EAPoL message ("msg 3") to the STA MLD at time $t_{11}$. The third EAPoL message may include a group temporal key (GTK) secured or encrypted with the PTK.

In some implementations, the third EAPoL message may further include a set of second KDEs. In some aspects, the AP MLD may encapsulate a plurality of second MAC addresses in the set of second KDEs. The plurality of second MAC addresses may include an MLD address of the AP MLD and the MAC addresses of each of the APs belonging to the AP MLD. At time $t_{12}$, the STA MLD may confirm that each of the plurality of second MAC addresses matches a respective one of the AP MAC addresses received in the association response at time $t_6$. In this manner, the STA MLD may verify the authenticity of the AP MAC addresses exchanged during the association process. In some implementations, one or more of the AP MAC addresses may be included in subsequent data communications, such as in a MAC header.

After time $t_{12}$, the STA MLD may proceed to generate one or more encryption keys that may be used to protect data carried in subsequently exchanged data frames. In the example of FIG. 5, the STA MLD generates a PTK at time $t_{13}$. In some implementations, the STA MLD may generate the PTK as a function of a pseudo-random function (PRF), a pairwise master key (PMK), the ANonce, and the SNonce. The PTK may be used to encrypt the subsequent data communications over multiple communication links.

If, between time $t_7$ and time $t_{15}$, the AP MLD or the STA MLD fails to verify one or more of the MAC addresses of the STA MAC addresses or the AP MAC addresses, respectively, the MLDs may be prevented from operating in an associated state.

In the example of FIG. 5, in response to the third EAPoL message, the STA MLD transmits a fourth EAPoL message ("msg 4") to the AP MLD at time $t_{14}$, to conclude the four-way handshake. After time $t_{14}$, the AP MLD and the STA MLD may use the PTKs to encrypt subsequent data communications over multiple communication links. For example, at time $t_{15}$, the AP MLD may transmit encrypted downlink (DL) data to the STA MLD. In some implementations, the AP MLD may encrypt the DL data using the PTK generated at time $t_{10}$ or using a portion of the PTK, such as a TK portion of the PTK. As another example, at time $t_{16}$, the STA MLD may transmit uplink (UL) data to the AP MLD. In some implementations, the STA MLD may encrypt the UL data using the PTK generated at time $t_{13}$ or using a portion of the PTK, such as a TK portion of the PTK.

In some other implementations, the set of first KDEs may be included in the fourth EAPoL message (rather than the second EAPoL message), for example, at time $t_{14}$. Between time $t_{14}$ and time $t_{15}$, the AP MLD may verify the STA addresses based on the set of first KDEs.

In addition, or in the alternative, one or more of the association request or the association response may include other information different than the MAC addresses. In such implementations, the AP MLD and/or the STA MLD may verify the other information during the handshake operation in a similar manner as described above with respect to the MAC addresses. For example, the other information may include one or more attributes of the AP MLD and/or the STA MLD, such as attributes related to the security of communications over the multiple communication links. In some aspects, the verified other information may be included in a MAC header of the subsequent data communications.

In some implementations, one or more of the AP MLD and the STA MLD may perform another association or reassociation process. For example, the STA MLD may reassociate with an AP other than the AP MLD via a fast roaming or fast BSS transition (FT) or a fast initial link setup (FILS), during which the STA MLD and/or the other AP may exchange information, such as one or more MAC addresses. In such implementations, the information may be included in one or more frames, Fast BSS Transition elements (FTEs), or information elements (IEs). In some aspects, the STA MLD or the other AP may verify the information in a manner similar to the AP MLD and the STA MLD verifying MAC addresses during a four-way handshake, as described above. In some implementations, the information may be verified during a security protocol other than the four-way handshake.

Figure 6:
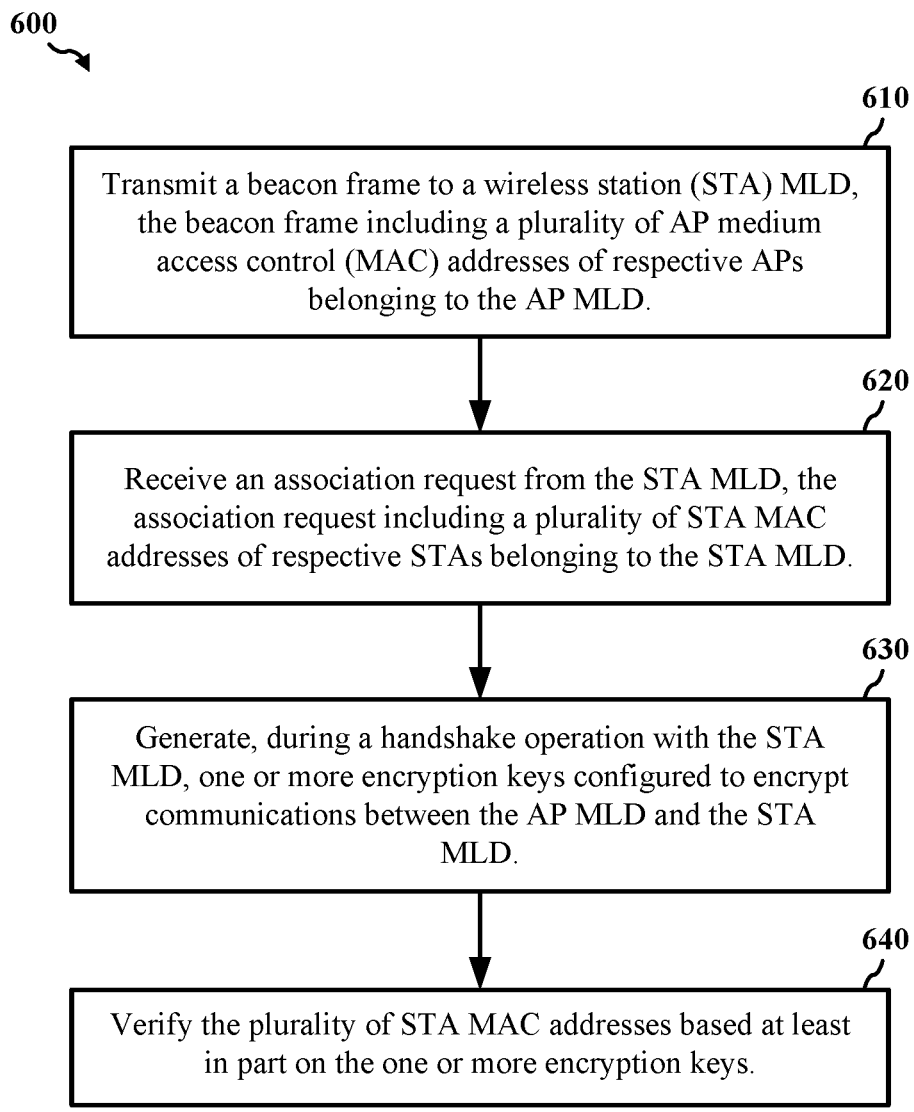
FIG. 6 shows a flowchart illustrating an example process for wireless communication that supports multi-link communications.

FIG. 6 shows a flowchart illustrating an example process 600 for wireless communication that supports multi-link communications. In some implementations, the operation 600 may be performed by a wireless communication device operating as or within an AP, such the AP 102 of FIG. 1 or the wireless communication device 400 of FIG. 4. In some instances, the AP may be an AP MLD.

In some implementations, at block 610, the AP MLD transmits a beacon frame to a wireless station (STA) MLD, the beacon frame including a plurality of AP medium access control (MAC) addresses of respective APs belonging to the AP MLD. At block 620, the AP MLD receives an association request from the STA MLD, the association request including a plurality of STA MAC addresses of respective STAs belonging to the STA MLD. At block 630, the AP MLD generates, during a handshake operation with the STA MLD, one or more encryption keys configured to encrypt communications between the AP MLD and the STA MLD. At block 640, the AP MLD verifies the plurality of STA MAC addresses based at least in part on the one or more encryption keys.

Figure 7A:
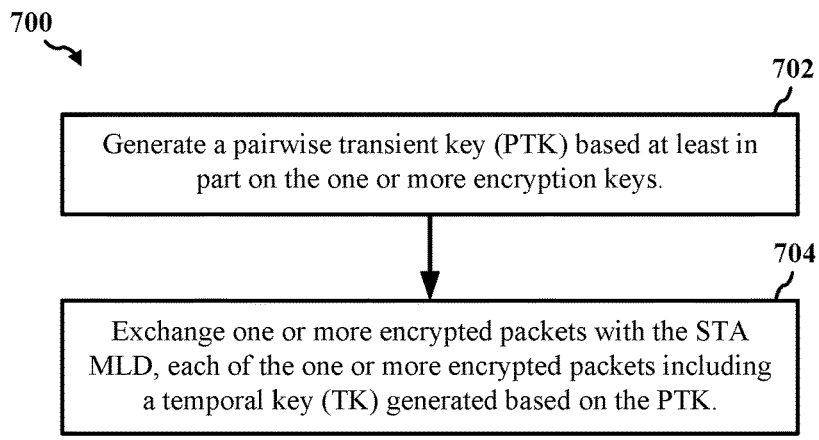
FIG. 7A shows a flowchart illustrating an example process for wireless communication that supports multi-link communications.

FIG. 7A shows a flowchart illustrating an example operation 700 for wireless communications that supports multi-link communications. In some implementations, the operation 700 may be performed by a wireless communication device operating as or within an AP, such as the AP 102 of FIG. 1 or the wireless communication device 400 of FIG. 4. In some instances, the AP may be an AP MLD. In some implementations, the operation 700 begins after verifying the plurality of STA MAC addresses at block 640 of FIG. 6.

For example, at block 702, the AP MLD generates a pairwise transient key (PTK) based at least in part on the one or more encryption keys. At block 704, the AP MLD exchanges one or more encrypted packets with the STA MLD, each of the one or more encrypted packets including a temporal key (TK) generated based on the PTK.

Figure 7B:
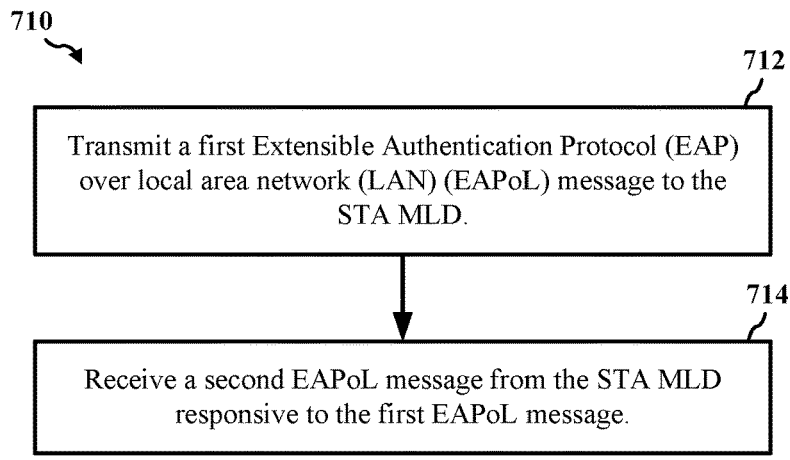
FIG. 7B shows a flowchart illustrating an example process for wireless communication that supports multi-link communications.

FIG. 7B shows a flowchart illustrating an example operation 710 for wireless communications that supports multi-link communications. In some implementations, the operation 710 may be performed by a wireless communication device operating as or within an AP, such as the AP 102 of FIG. 1 or the wireless communication device 400 of FIG. 4. In some instances, the AP may be an AP MLD. In some implementations, the operation 710 begins after verifying the plurality of STA MAC addresses at block 640 of FIG. 6.

For example, at block 712, the AP MLD transmits a first Extensible Authentication Protocol (EAP) over local area network (LAN) (EAPoL) message to the STA MLD. At block 714, the AP MLD receives a second EAPoL message from the STA MLD responsive to the first EAPoL message. In some implementations, the first EAPoL message includes an AP nonce (ANonce), and the second EAPoL message includes a STA nonce (SNonce) and a message integrity code (MIC). In some instances, the generation of the PTK is based at least in part on a pseudo-random function (PRF), a pairwise master key (PMK), the ANonce, or the SNonce. In some other instances, the second EAPoL message further includes a set of first key data encapsulations (KDEs) representative of an address of the STA MLD and a plurality of first MAC addresses, where verifying the plurality of STA MAC addresses includes confirming that each of the first MAC addresses matches a respective one of the STA MAC addresses. In some implementations, the AP MLD transmits a third EAPoL message to the STA MLD, the third EAPoL message including a group temporal key (GTK) and a set of second KDEs representative of an address of the AP MLD and a plurality of second MAC addresses.

Figure 7C:
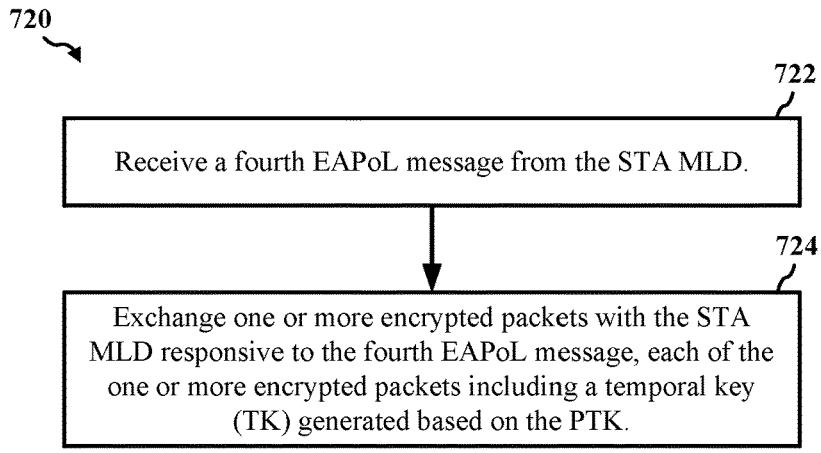
FIG. 7C shows a flowchart illustrating an example process for wireless communication that supports multi-link communications.

FIG. 7C shows a flowchart illustrating an example operation 720 for wireless communications that supports multi-link communications. In some implementations, the operation 720 may be performed by a wireless communication device operating as or within an AP, such as the AP 102 of FIG. 1 or the wireless communication device 400 of FIG. 4. In some instances, the AP may be an AP MLD. In some implementations, the operation 720 begins after verifying the plurality of STA MAC addresses at block 640 of FIG. 6.

For example, at block 722, the AP MLD receives a fourth EAPoL message from the STA MLD. At block 724, the AP MLD exchanges one or more encrypted packets with the STA MLD responsive to the fourth EAPoL message, each of the one or more encrypted packets including a temporal key (TK) generated based on the PTK.

Figure 8:
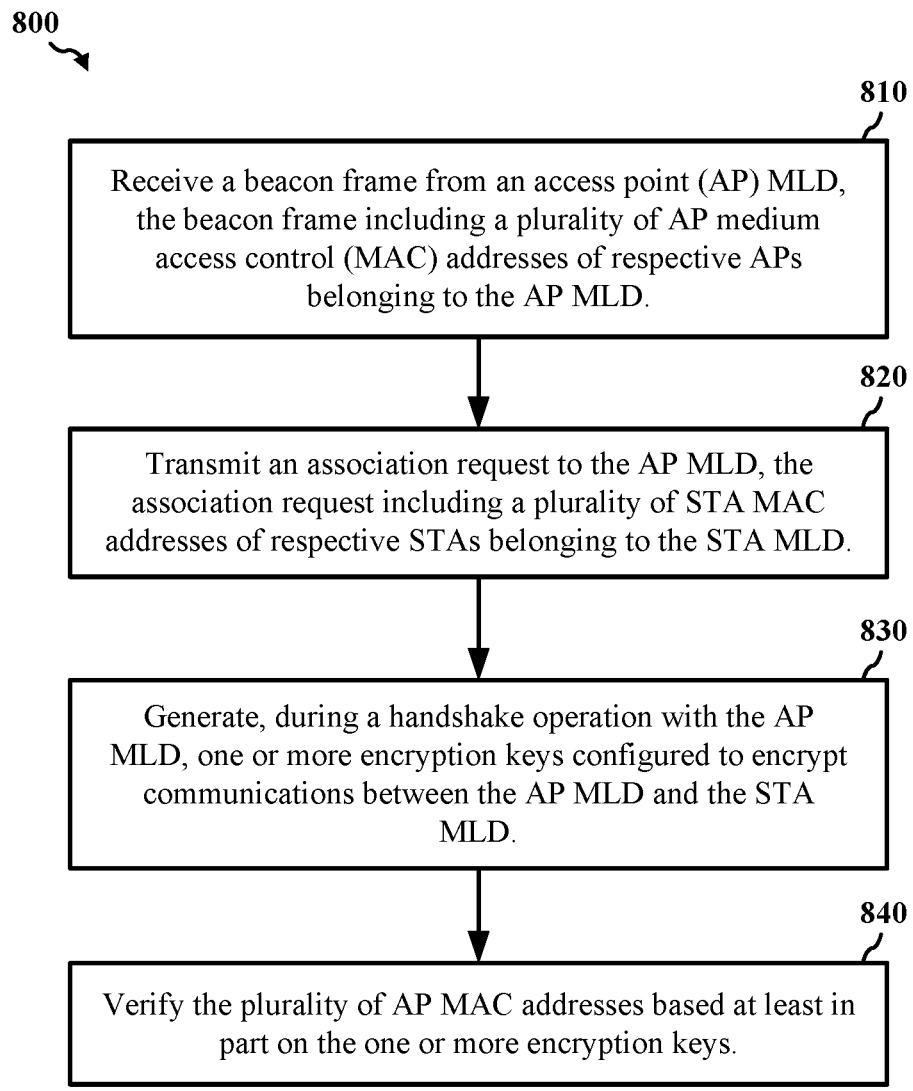
FIG. 8 shows a flowchart illustrating an example process for wireless communication that supports multi-link communications.

FIG. 8 shows a flowchart illustrating an example process 800 for wireless communication that supports multi-link communications. In some implementations, the operation 800 may be performed by a wireless communication device operating as or within a STA, such as one of the STAs 104 of FIG. 1 or the wireless communication device 400 of FIG. 4. In some instances, the STA may be a STA MLD. In addition, or in the alternative, the STA may be part of a STA MLD.

In some implementations, at block 810, the STA MLD receives a beacon frame from an access point (AP) MLD, the beacon frame including a plurality of AP medium access control (MAC) addresses of respective APs belonging to the AP MLD. At block 820, the STA MLD transmits an association request to the AP MLD, the association request including a plurality of STA MAC addresses of respective STAs belonging to the STA MLD. At block 830, the STA MLD generates, during a handshake operation with the AP MLD, one or more encryption keys configured to encrypt communications between the AP MLD and the STA MLD. At block 840, the STA MLD verifies the plurality of AP MAC addresses based at least in part on the one or more encryption keys.

Figure 9A:
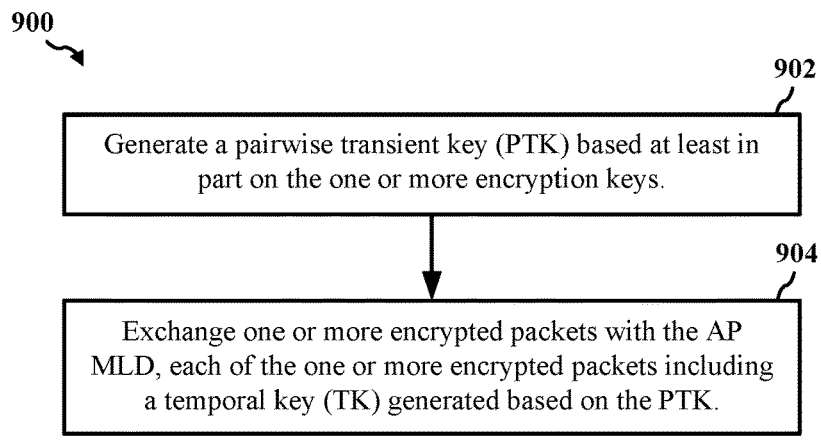
FIG. 9A shows a flowchart illustrating an example process for wireless communication that supports multi-link communications.

FIG. 9A shows a flowchart illustrating an example operation 900 for wireless communications that supports multi-link communications. In some implementations, the operation 900 may be performed by a wireless communication device operating as or within a STA, such as one of the STAs 104 of FIG. 1 or the wireless communication device 400 of FIG. 4. In some instances, the STA may be a STA MLD. In addition, or in the alternative, the STA may be part of a STA MLD. In some implementations, the operation 900 begins after verifying the plurality of AP MAC addresses at block 840 of FIG. 8.

For example, at block 902, the STA MLD generates a pairwise transient key (PTK) based at least in part on the one or more encryption keys. At block 904, the STA MLD exchanges one or more encrypted packets with the AP MLD, each of the one or more encrypted packets including a temporal key (TK) generated based on the PTK.

Figure 9B:
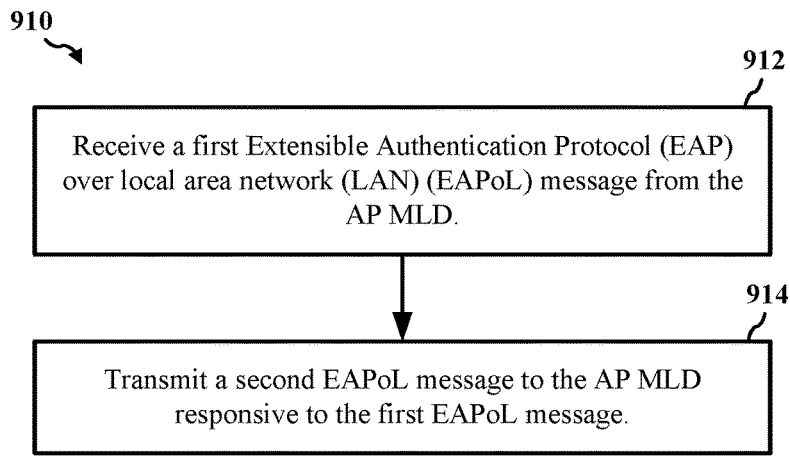
FIG. 9B shows a flowchart illustrating an example process for wireless communication that supports multi-link communications.

FIG. 9B shows a flowchart illustrating an example operation 910 for wireless communications that supports multi-link communications. In some implementations, the operation 910 may be performed by a wireless communication device operating as or within a STA, such as one of the STAs 104 of FIG. 1 or the wireless communication device 400 of FIG. 4. In some instances, the STA may be a STA MLD. In addition, or in the alternative, the STA may be part of a STA MLD. In some implementations, the operation 910 begins after verifying the plurality of AP MAC addresses at block 840 of FIG. 8.

For example, at block 912, the STA MLD receives a first Extensible Authentication Protocol (EAP) over local area network (LAN) (EAPoL) message from the AP MLD. At block 914, the STA MLD transmits a second EAPoL message to the AP MLD responsive to the first EAPoL message. In some implementations, the first EAPoL message includes an AP nonce (ANonce), and the second EAPoL message includes a STA nonce (SNonce) and a message integrity code (MIC). In some instances, the generation of the PTK is based at least in part on a pseudo-random function (PRF), a pairwise master key (PMK), the ANonce, or the SNonce. In some other instances, the second EAPoL message further includes a set of first key data encapsulations (KDEs) representative of an address of the STA MLD and a plurality of first MAC addresses. In some implementations, the STA MLD receives a third EAPoL message from the AP MLD, the third EAPoL message including a group temporal key (GTK) and a set of second KDEs representative of an address of the AP MLD and a plurality of second MAC addresses, where verifying the plurality of AP MAC addresses includes confirming that each of the second MAC addresses matches a respective one of the AP MAC addresses.

Figure 9C:
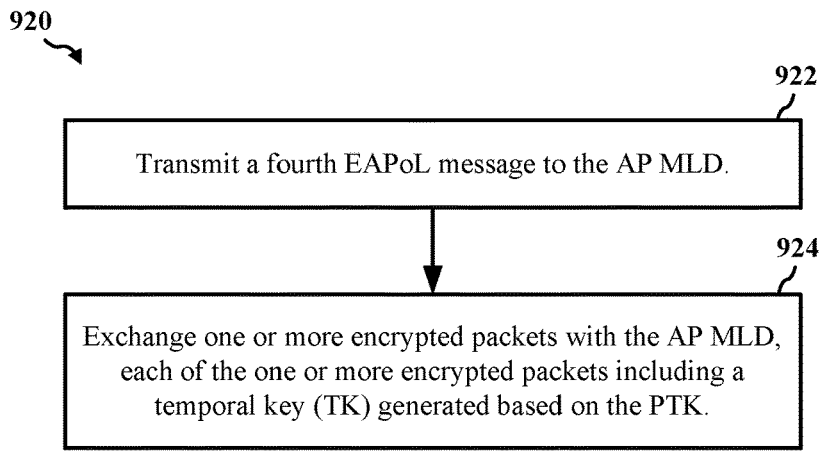
FIG. 9C shows a flowchart illustrating an example process for wireless communication that supports multi-link communications.

FIG. 9C shows a flowchart illustrating an example operation 920 for wireless communications that supports multi-link communications. In some implementations, the operation 920 may be performed by a wireless communication device operating as or within a STA, such as one of the STAs 104 of FIG. 1 or the wireless communication device 400 of FIG. 4. In some instances, the STA may be a STA MLD. In addition, or in the alternative, the STA may be part of a STA MLD. In some implementations, the operation 920 begins after verifying the plurality of AP MAC addresses at block 840 of FIG. 8.

For example, at block 922, the STA MLD transmits a fourth EAPoL message to the AP MLD. At block 924, the STA MLD exchanges one or more encrypted packets with the AP MLD, each of the one or more encrypted packets including a temporal key (TK) generated based on the PTK.

Implementation examples are described in the following numbered clauses:

1. A method for wireless communication performed by an access point (AP) multi-link device (MLD), the method including:

transmitting a beacon frame to a wireless station (STA) MLD, the beacon frame including a plurality of AP medium access control (MAC) addresses of respective APs belonging to the AP MLD;

receiving an association request from the STA MLD, the association request including a plurality of STA MAC addresses of respective STAs belonging to the STA MLD;

generating, during a handshake operation with the STA MLD, one or more encryption keys configured to encrypt communications between the AP MLD and the STA MLD; and verifying the plurality of STA MAC addresses based at least in part on the one or more encryption keys.

2. The method of clause 1, further including:

generating a pairwise transient key (PTK) based at least in part on the one or more encryption keys; and exchanging one or more encrypted packets with the STA MLD, each of the one or more encrypted packets including a temporal key (TK) generated based on the PTK.

3. The method of clause 2, further including:

transmitting a first Extensible Authentication Protocol (EAP) over local area network (LAN) (EAPoL) message to the STA MLD; and receiving a second EAPoL message from the STA MLD responsive to the first EAPoL message.

4. The method of clause 3, where:

the first EAPoL message includes an AP nonce (ANonce); and the second EAPoL message includes a STA nonce (SNonce) and a message integrity code (MIC).

5. The method of any one or more of clauses 2-4, where the generation of the PTK is based at least in part on a pseudo-random function (PRF), a pairwise master key (PMK), the ANonce, or the SNonce.

6. The method of clause 4, where the second EAPoL message further includes a set of first key data encapsulations (KDEs) representative of an address of the STA MLD and a plurality of first MAC addresses, where verifying the plurality of STA MAC addresses includes:

confirming that each of the first MAC addresses matches a respective one of the STA MAC addresses.

7. The method of clause 6, further including transmitting a third EAPoL message to the STA MLD, the third EAPoL message including a group temporal key (GTK) and a set of second KDEs representative of an address of the AP MLD and a plurality of second MAC addresses.

8. The method of clause 7, further including:
receiving a fourth EAPoL message from the STA MLD; and
exchanging one or more encrypted packets with the STA MLD responsive to the fourth EAPoL message, each of the one or more encrypted packets including a temporal key (TK) generated based on the PTK.

9. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to:
  transmit a beacon frame to a wireless station (STA) MLD, the beacon frame including a plurality of AP medium access control (MAC) addresses of respective APs belonging to the AP MLD;
  receive an association request from the STA MLD, the association request including a plurality of STA MAC addresses of respective STAs belonging to the STA MLD;
  generate, during a handshake operation with the STA MLD, one or more encryption keys configured to encrypt communications between the AP MLD and the STA MLD; and
  verify the plurality of STA MAC addresses based at least in part on the one or more encryption keys.

10. The wireless communication device of clause 9, where execution of the processor-readable code is further configured to:
generate a pairwise transient key (PTK) based at least in part on the one or more encryption keys; and
exchange one or more encrypted packets with the STA MLD, each of the one or more encrypted packets including a temporal key (TK) generated based on the PTK.

11. The wireless communication device of clause 10, where execution of the processor-readable code is further configured to:
transmit a first Extensible Authentication Protocol (EAP) over local area network (LAN) (EAPoL) message to the STA MLD; and
receive a second EAPoL message from the STA MLD responsive to the first EAPoL message.

12. The wireless communication device of clause 11, where:
the first EAPoL message includes an AP nonce (ANonce); and
the second EAPoL message includes a STA nonce (SNonce) and a message integrity code (MIC).

13. The wireless communication device of any one or more of clauses 10-12, where the generation of the PTK is based at least in part on a pseudo-random function (PRF), a pairwise master key (PMK), the ANonce, or the SNonce.

14. The wireless communication device of clause 12, where the second EAPoL message further includes a set of first key data encapsulations (KDEs) representative of an address of the STA MLD and a plurality of first MAC addresses, where verifying the plurality of STA MAC addresses includes:
confirming that each of the first MAC addresses matches a respective one of the STA MAC addresses.

15. The wireless communication device of clause 14, where execution of the processor-readable code is further configured to transmit a third EAPoL message to the STA MLD, the third EAPoL message including a group temporal key (GTK) and a set of second KDEs representative of an address of the AP MLD and a plurality of second MAC addresses.

16. A method for wireless communication performed by a wireless station (STA) multi-link device (MLD), the method including:
receiving a beacon frame from an access point (AP) MLD, the beacon frame including a plurality of AP medium access control (MAC) addresses of respective APs belonging to the AP MLD;
transmitting an association request to the AP MLD, the association request including a plurality of STA MAC addresses of respective STAs belonging to the STA MLD;
generating, during a handshake operation with the AP MLD, one or more encryption keys configured to encrypt communications between the AP MLD and the STA MLD; and verifying the plurality of AP MAC addresses based at least in part on the one or more encryption keys.

17. The method of clause 16, further including:
generating a pairwise transient key (PTK) based at least in part on the one or more encryption keys; and
exchanging one or more encrypted packets with the AP MLD, each of the one or more encrypted packets including a temporal key (TK) generated based on the PTK.

18. The method of any one or more of clauses 16-17, further including:
receiving a first Extensible Authentication Protocol (EAP) over local area network (LAN) (EAPoL) message from the AP MLD; and
transmitting a second EAPoL message to the AP MLD responsive to the first EAPoL message.

19. The method of clause 18, where:
the first EAPoL message includes an AP nonce (ANonce); and
the second EAPoL message includes a STA nonce (SNonce) and a message integrity code (MIC).

20. The method of any one or more of clauses 17-19, where the generation of the PTK is based at least in part on a pseudo-random function (PRF), a pairwise master key (PMK), the ANonce, or the SNonce.

21. The method of clause 19, where the second EAPoL message further includes a set of first key data encapsulations (KDEs) representative of an address of the STA MLD and a plurality of first MAC addresses.

22. The method of clause 21, further including receiving a third EAPoL message from the AP MLD, the third EAPoL message including a group temporal key (GTK) and a set of second KDEs representative of an address of the AP MLD and a plurality of second MAC addresses, where verifying the plurality of AP MAC addresses includes confirming that each of the second MAC addresses matches a respective one of the AP MAC addresses.

23. The method of clause 22, further including:
transmitting a fourth EAPoL message to the AP MLD; and
exchanging one or more encrypted packets with the AP MLD, each of the one or more encrypted packets including a temporal key (TK) generated based on the PTK.

24. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to:
receive a beacon frame from an access point (AP) MLD, the beacon frame including a plurality of AP medium access control (MAC) addresses of respective APs belonging to the AP MLD;
transmit an association request to the AP MLD, the association request including a plurality of STA MAC addresses of respective STAs belonging to the STA MLD;
generate, during a handshake operation with the AP MLD, one or more encryption keys configured to encrypt communications between the AP MLD and the STA MLD; and
verify the plurality of AP MAC addresses based at least in part on the one or more encryption keys.

25. The wireless communication device of clause 24, where execution of the processor-readable code is further configured to:
generate a pairwise transient key (PTK) based at least in part on the handshake operation; and
exchange one or more encrypted packets with the AP MLD, each of the one or more encrypted packets including a temporal key (TK) generated based on the PTK.

26. The wireless communication device of any one or more of clauses 24-25, where execution of the processor-readable code is further configured to:
receive a first Extensible Authentication Protocol (EAP) over local area network (LAN) (EAPoL) message from the AP MLD; and
transmit a second EAPoL message to the AP MLD responsive to the first EAPoL message.

27. The wireless communication device of clause 26, where:
the first EAPoL message includes an AP nonce (ANonce); and the second EAPoL message includes a STA nonce (SNonce) and a message integrity code (MIC).

28. The wireless communication device of any one or more of clauses 25-27, where the generation of the PTK is based at least in part on a pseudo-random function (PRF), a pairwise master key (PMK), the ANonce, or the SNonce.

29. The wireless communication device of clause 27, where the second EAPoL message further includes a set of first key data encapsulations (KDEs) representative of an address of the STA MLD and a plurality of first MAC addresses.

30. The wireless communication device of clause 29, where execution of the processor-readable code is further configured to receive a third EAPoL message from the AP MLD, the third EAPoL message including a group temporal key (GTK) and a set of second KDEs representative of an address of the AP MLD and a plurality of second MAC addresses, where verifying the plurality of AP MAC addresses includes confirming that each of the second MAC addresses matches a respective one of the AP MAC addresses.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method for wireless communication performed by a first multi-link device (MLD), the method comprising:
   transmitting a beacon frame to a second MLD, the beacon frame including one or more first medium access control (MAC) addresses of respective first devices belonging to the first MLD;
   receiving an association request or a reassociation request from the second MLD, the association request or the reassociation request including one or more second MAC addresses of respective second devices belonging to the second MLD;
   generating, during a handshake operation with the second MLD, one or more encryption keys configured to encrypt communications between the first MLD and the second MLD;
   transmitting a first Extensible Authentication Protocol (EAP) over local area network (LAN) (EAPOL) message to the second MLD;
   receiving a second EAPOL message from the second MLD responsive to the first EAPOL message, wherein the second EAPOL message includes a first set of key data encapsulations (KDEs) encapsulating an address of the second MLD and the one or more second MAC addresses;
   verifying the one or more second MAC addresses based at least in part on the one or more encryption keys and the first set of KDEs, wherein verifying the one or more second MAC addresses includes confirming that each of the one or more second MAC addresses received via the second EAPOL message matches a respective one of the one or more second MAC addresses received via the association request or the reassociation request; and
   generating a pairwise transient key (PTK) based at least in part on the one or more encryption keys.

2. The method of claim 1, further comprising:
   exchanging one or more encrypted packets with the second MLD, each of the one or more encrypted packets including a temporal key (TK) generated based on the PTK.

3. The method of claim 2, wherein:
   the first EAPOL message includes an access point (AP) nonce (ANonce); and
   the second EAPOL message includes a station (STA) nonce (SNonce) and a message integrity code (MIC).

4. The method of claim 3, wherein the generation of the PTK is based at least in part on a pseudo-random function (PRF), a pairwise master key (PMK), the ANonce, or the SNonce.

5. The method of claim 4, further comprising:
   transmitting a third EAPOL message to the second MLD, the third EAPOL message including a group temporal key (GTK) and a second set of KDEs representative of an address of the first MLD and the one or more first MAC addresses.

6. The method of claim 5, further comprising:
   receiving a fourth EAPOL message from the second MLD; and
   exchanging the one or more encrypted packets with the second MLD responsive to the fourth EAPOL message, each of the one or more encrypted packets including the TK generated based on the PTK.

7. A wireless communication device comprising:
   at least one modem;
   one or more processors communicatively coupled with the at least one modem; and
   one or more memories communicatively coupled with the one or more processors and storing processor-readable code that, when executed by the one or more processors in conjunction with the at least one modem, is configured to:
   transmit a beacon frame to a second MLD, the beacon frame including one or more first medium access control (MAC) addresses of respective first devices belonging to a first MLD;
   receive an association request or a reassociation request from the second MLD, the association request or the reassociation request including one or more second MAC addresses of respective second devices belonging to the second MLD;
   generate, during a handshake operation with the second MLD, one or more encryption keys configured to encrypt communications between the first MLD and the second MLD;
   transmit a first Extensible Authentication Protocol (EAP) over local area network (LAN) (EAPOL) message to the second MLD;
   receive a second EAPOL message from the second MLD responsive to the first EAPOL message, wherein the second EAPOL message includes a first set of key data encapsulations (KDEs) encapsulating an address of the second MLD and the one or more second MAC addresses;
   verify the one or more second MAC addresses based at least in part on the one or more encryption keys and the first set of KDEs, wherein verifying the one or more second MAC addresses includes confirming that each of the one or more second MAC addresses received via the second EAPOL message matches a respective one of the one or more second MAC addresses received via the association request or the reassociation request; and
   generate a pairwise transient key (PTK) based at least in part on the one or more encryption keys.

8. The wireless communication device of claim 7, wherein execution of the processor-readable code is further configured to:
   exchange one or more encrypted packets with the second MLD, each of the one or more encrypted packets including a temporal key (TK) generated based on the PTK.

9. The wireless communication device of claim 8, wherein:
   the first EAPOL message includes an access point (AP) nonce (ANonce); and
   the second EAPOL message includes a station (STA) nonce (SNonce) and a message integrity code (MIC).

10. The wireless communication device of claim 9, wherein the generation of the PTK is based at least in part on a pseudo-random function (PRF), a pairwise master key (PMK), the ANonce, or the SNonce.

11. The wireless communication device of claim 10, wherein execution of the processor-readable code is further configured to transmit a third EAPOL message to the second MLD, the third EAPOL message including a group temporal key (GTK) and a second set of KDEs representative of an address of the first MLD and the one or more first MAC addresses.

12. A method for wireless communication performed by a first multi-link device (MLD), the method comprising:
receiving, at the first MLD, a beacon frame from a second MLD, the beacon frame including one or more first medium access control (MAC) addresses of respective second devices belonging to the second MLD;
transmitting an association request or a reassociation request to the second MLD, the association request or the reassociation request including one or more second MAC addresses of respective first devices belonging to the first MLD;
generating, during a handshake operation with the second MLD, one or more encryption keys configured to encrypt communications between the second MLD and the first MLD;
receiving a first Extensible Authentication Protocol (EAP) over local area network (LAN) (EAPOL) message from the second MLD;
transmitting a second EAPOL message to the second MLD responsive to the first EAPOL message, wherein the second EAPOL message includes a first set of key data encapsulations (KDEs) encapsulating an address of the first MLD and the one or more second MAC addresses;
receiving a third EAPOL message from the second MLD, the third EAPOL message including a group temporal key (GTK) and a second set of KDEs representative of an address of the second MLD and the one or more first MAC addresses;
verifying the one or more first MAC addresses based at least in part on the one or more encryption keys and the first set of KDEs, wherein verifying the one or more first MAC addresses includes confirming that each of the one or more first MAC addresses received via the third EAPOL message matches a respective one of the one or more first MAC addresses received via the beacon frame; and
generating a pairwise transient key (PTK) based at least in part on the one or more encryption keys.

13. The method of claim 12, further comprising:
exchanging one or more encrypted packets with the second MLD, each of the one or more encrypted packets including a temporal key (TK) generated based on the PTK.

14. The method of claim 13, wherein:
the second EAPOL message includes an access point (AP) nonce (ANonce); and
the first EAPOL message includes a station (STA) nonce (SNonce) and a message integrity code (MIC).

15. The method of claim 14, wherein the generation of the PTK is based at least in part on a pseudo-random function (PRF), a pairwise master key (PMK), the ANonce, or the SNonce.

16. The method of claim 15, further comprising:
transmitting a fourth EAPOL message to the second MLD; and
exchanging the one or more encrypted packets with the second MLD, each of the one or more encrypted packets including the TK generated based on the PTK.

17. A wireless communication device comprising:
at least one modem;
one or more processors communicatively coupled with the at least one modem; and
one or more memories communicatively coupled with the one or more processors and storing processor-readable code that, when executed by the one or more processors in conjunction with the at least one modem, is configured to:
receive, at a first multi-link device (MLD), a beacon frame from a second MLD, the beacon frame including one or more first medium access control (MAC) addresses of respective second devices belonging to the second MLD;
transmit an association request or a reassociation request to the second MLD, the association request or the reassociation request including one or more second MAC addresses of respective first devices belonging to the first MLD;
generate, during a handshake operation with the second MLD, one or more encryption keys configured to encrypt communications between the second MLD and the first MLD;
receive a first Extensible Authentication Protocol (EAP) over local area network (LAN) (EAPOL) message from the second MLD;
transmit a second EAPOL message to the second MLD responsive to the first EAPOL message, wherein the second EAPOL message includes a first set of key data encapsulations (KDEs) encapsulating an address of the first MLD and the one or more second MAC addresses; receive a third EAPOL message from the second MLD, the third EAPOL message including a group temporal key (GTK) and a second set of KDEs representative of an address of the second MLD and the one or more first MAC addresses;
verify the one or more first MAC addresses based at least in part on the one or more encryption keys and the first set of KDEs, wherein verifying the one or more first MAC addresses includes confirming that each of the one or more first MAC addresses received via the third EAPOL message matches a respective one of the one or more first MAC addresses received via the beacon frame; and
generate a pairwise transient key (PTK) based at least in part on the one or more encryption keys.

18. The wireless communication device of claim 17, wherein execution of the processor-readable code is further configured to:
exchange one or more encrypted packets with the second MLD, each of the one or more encrypted packets including a temporal key (TK) generated based on the PTK.

19. The wireless communication device of claim 18, wherein:
the second EAPOL message includes an access point (AP) nonce (ANonce); and
the first EAPOL message includes a station (STA) nonce (SNonce) and a message integrity code (MIC).

20. The wireless communication device of claim 19, wherein the generation of the PTK is based at least in part on a pseudo-random function (PRF), a pairwise master key (PMK), the ANonce, or the SNonce.

* * * * *